(12) United States Patent
Hayashi

(10) Patent No.: US 8,855,842 B2
(45) Date of Patent: Oct. 7, 2014

(54) VEHICULAR CHARGING FACILITY GUIDANCE DEVICE, VEHICULAR CHARGING FACILITY GUIDANCE METHOD, AND COMPUTER PROGRAM

(75) Inventor: Takashi Hayashi, Okazaki (JP)

(73) Assignee: Aisin AW Co. Ltd., Tokyo (JP)

( * ) Notice: Subject to any disclaimer, the term of this patent is extended or adjusted under 35 U.S.C. 154(b) by 748 days.

(21) Appl. No.: 13/011,562

(22) Filed: Jan. 21, 2011

(65) Prior Publication Data

US 2011/0238287 A1 Sep. 29, 2011

(30) Foreign Application Priority Data

Mar. 24, 2010 (JP) ................. 2010-068634

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *G01C 21/36* | (2006.01) | |

(52) U.S. Cl.
CPC .................... *G01C 21/3682* (2013.01)
USPC .............. 701/22; 701/123; 701/426; 701/438

(58) Field of Classification Search
USPC .......... 701/200, 110, 22, 29.5, 410, 414, 420, 701/426, 532, 533, 123, 400, 431, 438; 320/109; 340/995.1, 995.27; 455/456.5
See application file for complete search history.

(56) References Cited

U.S. PATENT DOCUMENTS

| | | | |
|---|---|---|---|
| 5,539,399 A | 7/1996 | Takahira et al. | |
| 7,568,166 B2 * | 7/2009 | Kato | ............................ 715/784 |
| 2005/0049779 A1 | 3/2005 | Yasuda et al. | |
| 2009/0055094 A1 | 2/2009 | Suzuki | |

(Continued)

FOREIGN PATENT DOCUMENTS

| | | |
|---|---|---|
| JP | 2000-131116 A | 5/2000 |
| JP | 2002-162235 A | 6/2002 |

(Continued)

OTHER PUBLICATIONS

Japanese Office Action dated Oct. 16, 2012 issued in Japanese Patent Application No. 2010-068634.

(Continued)

*Primary Examiner* — Tuan C. To
*Assistant Examiner* — Isaac Smith
(74) *Attorney, Agent, or Firm* — Sughrue Mion, PLLC

(57) ABSTRACT

A vehicular charging facility guidance device is provided. The guidance device includes a route setting unit that sets a route from a departure point of a vehicle to a destination, a map display unit that displays a map on a display device, and a route display unit that displays the route set by the route setting unit to be overlapped with the map displayed on the display device. The guidance device also includes a frame display unit that displays a frame to be overlapped with the route on the display device and a frame movement unit that moves a reference position of the frame displayed by the frame display unit along the route. The guidance devise further includes a charging facility guidance unit that provides information on a charging facility located within an area delimited by the frame on the map.

10 Claims, 9 Drawing Sheets

(56) References Cited

U.S. PATENT DOCUMENTS

2009/0157289 A1    6/2009  Graessley
2010/0057357 A1*   3/2010  Miyata et al. ................ 701/209
2010/0094496 A1*   4/2010  Hershkovitz et al. .......... 701/22

FOREIGN PATENT DOCUMENTS

| JP | 4389510 B2    | 2/2005  |
| JP | 2006-214939 A | 8/2006  |
| JP | 2007-240365 A | 9/2007  |
| JP | 2007-276665 A | 10/2007 |
| JP | 2008-051537 A | 3/2008  |

OTHER PUBLICATIONS

Extended European Search Report, dated Nov. 29, 2013, issued in counterpart European Patent Application No. 11151668.8.

* cited by examiner

F I G . 1
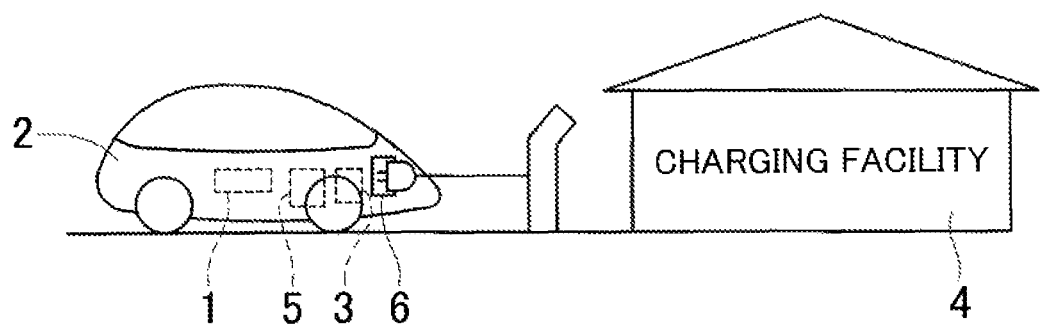

FIG. 3

| FACILITY NUMBER | 10001 | 10002 | 10003 | ... |
|---|---|---|---|---|
| FACILITY NAME | XX STORE | XY PARKING LOT | YY STATION | ... |
| FACILITY CATEGORY | MALL/ CHARGING FACILITY | PARKING LOT/ CHARGING FACILITY | CHARGING FACILITY | ... |
| POSITION COORDINATE | (x1,y1) | (x2,y2) | (x3,y3) | ... |
| BUSINESS HOURS | 9:00-22:00 | OPEN 24 HOURS | 8:00-21:00 | ... |
| CHARGING FEE | 15 yen/kWh | 25 yen/kWh | 20 yen/kWh | ... |
| ... | ... | ... | ... | ... |

# VEHICULAR CHARGING FACILITY GUIDANCE DEVICE, VEHICULAR CHARGING FACILITY GUIDANCE METHOD, AND COMPUTER PROGRAM

INCORPORATION BY REFERENCE

This application claims priority from Japanese Patent Application No. 2010-068634 filed on Mar. 24, 2010, including the specification, drawings and abstract thereof, the disclosure of which is incorporated herein by reference in its entirety.

BACKGROUND OF THE INVENTION

1. Field of the Invention

Aspects of the present invention relate to a vehicular charging facility guidance device, a vehicular charging facility guidance method, and a computer program that provides information of a charging facility located on a map.

2. Description of the Related Art

In the related art, many vehicles are mounted with a navigation device that performs travel guidance for the vehicle in order to enable a driver to easily arrive at a desired destination. The navigation device here is a device that is capable of detecting a current position of a host vehicle with use of a GPS receiver and the like, acquiring map data corresponding to the current position through a network, or a recording medium such as a DVD-ROM and a hard disk drive (HDD), and displaying such data on a liquid crystal monitor. Further, the navigation device provides information on a category and a position of a facility existing in the vicinity of the current position of the host vehicle and provides information on the position of the facility corresponding to the category designated by a user and a route to the facility.

Also, in addition to a gasoline vehicle having an engine as a drive source, there exist electric vehicles using an electric motor that is driven based on electric power supplied from a battery as the drive source, a hybrid vehicle using the electric motor in combination with the engine as the drive source, and the like.

As a method to charge the battery mounted in the electric or hybrid vehicle, there are various methods such as charging the battery with regenerative electric power generated by the motor while the vehicle is decelerating or traveling down a slope, charging the battery with use of a generator driven based on the engine, and also charging the battery at a home or a vehicular charging facility. In addition, in the electric vehicle and the hybrid vehicle, a distance that can be traveled using only the electric motor as the drive force limited even when the battery is fully charged.

Consequently, in the case of electric and hybrid vehicles, it is beneficial to provide information on the charging facility provided with a charging unit that is capable of charging the battery. For example, Japanese Patent Application; Publication No. JP-A-4389510 discloses a technology that if the route to the destination is set, information is acquired on a charging facility on the route that can be reached with the current remaining amount of battery power. Also, the current position of the vehicle and the position of the acquired charging facility are displayed when displaying the map of the vicinity of the vehicle.

SUMMARY OF THE INVENTION

In the technology disclosed by Japanese Patent Application; Publication No. JP-A-4389510, when a driving vehicle has approached the charging facility located along the route, the position of the charging facility is displayed. Therefore, before arriving in the vicinity of the charging facility, the driver cannot determine the charging facility on the route. As a result, for example, a problem as indicated below occurs.

To charge the vehicle at the charging facility, a certain time period (wait time for charging) is required. Therefore, it is important for the user to select the charging facility to stop-by based on a position on a guidance route to stop-by the charging facility, that is, the timing to stop-by the charging facility while traveling the guidance route. For example, stopping-by the charging facility in accordance with a rest time, or stopping-by the charging facility in the vicinity of a middle point along the route. According to the technology disclosed in Patent Document 1, it is possible to provide the user with the information on the charging facility on the guidance route that can be reached with the current remaining amount of the battery of the vehicle; however, the user cannot know the position of the charging facility with respect to the route, thereby making it difficult to plan the charging of the battery.

In order to solve the problem described above, various aspects of the present invention provide a vehicular charging facility guidance device, a vehicular charging facility guidance method, and a computer program that enable the user to easily make a plan for the position to charge an in-vehicle battery with respect to the route when traveling the route to the destination.

To achieve the aforementioned aspects, a vehicular charging facility guidance device (1) according to a first aspect includes: a route setting unit (13) that sets a route (52) from a departure point of a vehicle (2) to a destination; a map display unit (13) that displays a map on a display device (15); a route display unit (13) that displays the route set by the route setting unit to be overlapped with the map displayed on the display device; a frame display unit (13) that displays a frame (55) to be overlapped with the route on the display device, the frame of which a reference position is allocated at a point on the route; a frame movement unit (13) that moves the reference position of the frame displayed by the frame display unit along the route; and a charging facility guidance unit (13) that provides information on a charging facility located within an area delimited by the frame on the map.

The vehicular charging facility guidance device (1) according to a second aspect includes, in the vehicular charging facility guidance device according to the first aspect: a remaining energy amount prediction unit (13) that predicts remaining energy amount of an in-vehicle battery (3) at each point on the route in case that the vehicle (2) travels the route (52), the in-vehicle battery supplying electric power to a drive source (5) of the vehicle; and an energy amount size setting unit (13) that sets a size of the frame, of which the reference position is allocated at the point on the route, based on the predicted remaining energy amount of the in-vehicle battery at the point.

The vehicular charging facility guidance device (1) according to a third aspect includes, in the vehicular charging facility guidance device according to the first aspect: a facility number size setting unit that sets a size of the frame (55), of which the reference position is allocated at the point on the route, based on distribution of charging facilities in the vicinity of the point.

The vehicular charging facility guidance device (1) according to a fourth aspect includes, in the vehicular charging facility guidance device according to any one of the first to third aspects: a travel determination unit (13) that, in case that the vehicle (2) travels the route (52), determines whether or not the vehicle is able to travel to the destination without charging an in-vehicle battery (3) that supplies electric power to a drive source (5) of the vehicle; an intermediate point prediction unit (13) that, in case that the vehicle travels the route, predicts as an intermediate point a point at which a remaining energy amount of the in-vehicle battery becomes a predetermined value; and an initial position setting unit (13) that, if the travel determination unit (13) determines that the vehicle is able to travel to the destination without charging the in-vehicle battery, sets an initial position of the reference position of the frame to the destination, and if the travel determination unit determines that the vehicle is not able to travel to the destination without charging the in-vehicle battery, sets the initial position of the reference position of the frame to the intermediate point.

The vehicular charging facility guidance device (1) according to a fifth aspect includes, in the vehicular charging facility guidance device according to any one of the first to fourth aspects: a travel limit point prediction unit (13) that, in case that the vehicle (2) travels the route (52), predicts as a travel limit point a point which is closest to the destination among points on the route to which the vehicle is able to travel without charging an in-vehicle battery (3) that supplies electric power to a drive source (5) of the vehicle, wherein the frame movement unit moves the reference position of the frame (55) to the travel limit point if the reference position of the frame has been moved toward the destination beyond the travel limit point.

The vehicular charging facility guidance device (1) according to a sixth aspect includes, in the vehicular charging facility guidance device according to any one of the first to fifth aspects of the present invention: a charging facility determination unit (13) that determines whether or not there is the charging facility within the area delimited by the frame (55) on the map, wherein the frame movement unit (13), if the charging facility determination unit determines that there is not the charging facility within the area delimited by the frame on the map, moves the reference position of the frame to a position at which the charging facility is included in the area delimited by the frame on the map.

The vehicular charging facility guidance device (1) according to a seventh aspect includes, in the vehicular charging facility guidance device according to any one of the first to sixth aspects, the charging facility guidance unit (13) enlarges and displays the area delimited by the frame (55) on the map on the display device (15), and displays a mark (62) to identify a position of the charging facility to be overlapped with the map.

A vehicular charging facility guidance method according to a eighth aspect includes the steps of: setting a route (52) from a departure point of a vehicle (2) to a destination; displaying a map on a display device (15); displaying the route set at the route setting step to be overlapped with the map displayed on the display device; displaying a frame (55) to be overlapped with the route on the display device, the frame of which a reference position is allocated at a point on the route; moving the reference position of the frame displayed at the frame display step along the route; and providing information on a charging facility located within an area delimited by the frame on the map.

A program according to a ninth aspect includes a program for causing a computer to perform the functions of: setting a route (52) from a departure point of a vehicle (2) to a destination; displaying a map on a display device (15); displaying the route set by the route setting function to be overlapped with the map displayed on the display device; displaying a frame (55) to be overlapped with the route on the display device, the frame of which a reference position is allocated at a point on the route; moving the reference position of the frame displayed by the frame display function along the route; and providing information on a charging facility located within an area delimited by the frame on the map.

According to the vehicular charging facility guidance device in the first aspect having the above-mentioned structure, the information on the charging facility in the vicinity of the route is provided using the frame that moves along the route. Therefore, in traveling the route to the destination, the user easily makes a plan regarding the position on the route to charge the in-vehicle battery.

According to the vehicular charging facility guidance device in the second aspect, in case that the vehicle travels the route, the size of the frame, of which the reference position is allocated at the point on the route, changes based on the remaining energy amount of the in-vehicle battery at the point on the route. Therefore, it is possible to provide the information on the charging facility located in the area within which the vehicle is able to travel. Consequently, it is possible to provide the information exclusively on the charging facility useful for the user.

According to the vehicular charging facility guidance device in the third aspect, the size of the frame changes based on the distribution of the charging facilities in the vicinity of the point where the reference point of the frame is allocated. Therefore, it is possible to change the size of the frame based on the density and the number of the charging facilities. As a result, for example, it is possible to prevent to provide the information on an excessive number of the charging facilities in the region where the charging facilities are densely distributed, and to provide the information on a minimum number of the charging facilities required for the user to select the charging facility to stop-by in the region where the charging facilities are sparsely distributed.

According to the vehicular charging facility guidance device in the fourth aspect, if it is not determined that the vehicle is able to travel to the destination without charging the in-vehicle battery, the initial position of the frame is set to the intermediate point at which the remaining energy amount of the in-vehicle battery becomes the predetermined value. Therefore, it is possible to firstly provide the user with the information on the charging facility for the area where the user is predicted to charge the in-vehicle battery. Consequently, it is possible to reduce operations to be performed by the user. In addition, if it is determined that the vehicle is able to travel to the destination without charging the in-vehicle battery, the initial position of the reference position of the frame is set to the destination. Therefore, the user can recognize at a glance that the vehicle is able to travel to the destination without charging the in-vehicle battery.

According to the vehicular charging facility guidance device in the fifth aspect, in case that the vehicle travels the guidance route, if the reference position of the frame has been moved toward the destination beyond the travel limit point to which the vehicle is able to travel, the reference position of the frame is moved to the travel limit point. Therefore, it is possible not to provide the information on the charging facility in the area where the vehicle is not able to travel with the current remaining battery amount of the in-vehicle battery, but to provide the information exclusively on the charging facility useful for the user.

According to the vehicular charging facility guidance device in the sixth aspect, if it is determined that there is not the charging facility in the area delimited by the frame on the map, the reference position of the frame is moved to the position at which the charging facility is included in the area delimited by the frame on the map. Therefore, it is possible to avoid providing the information for the area of which information is not necessary for the user. Further, it is possible to reduce operations to be performed by the user.

According to the vehicular charging facility guidance device in the seventh aspect, it is possible to properly provide the information on the detailed position of each charging facility in the vicinity of the route and the distribution of the charging facilities.

According to the vehicular charging facility guidance method in the eighth aspect, the information on the charging facility in the vicinity of the route is provided using the frame that moves along the route. Therefore, in traveling the route to the destination, the user easily makes a plan regarding the position on the route to charge the in-vehicle battery.

According to the computer program in the ninth aspect, the information on the charging facility in the vicinity of the route is provided using the frame that moves along the route. Therefore, in traveling the route to the destination, the user easily makes a plan regarding the position on the route to charge the in-vehicle battery.

BRIEF DESCRIPTION OF THE DRAWINGS

FIG. 1 is a schematic view of a charging facility and a vehicle provided with a navigation device according to an embodiment as an in-vehicle-device.

FIG. 3 shows an example of facility data of facilities, in particular, corresponding to charging facilities among the facility data.

DETAILED DESCRIPTION OF THE EXEMPLARY EMBODIMENTS

Figure 2:
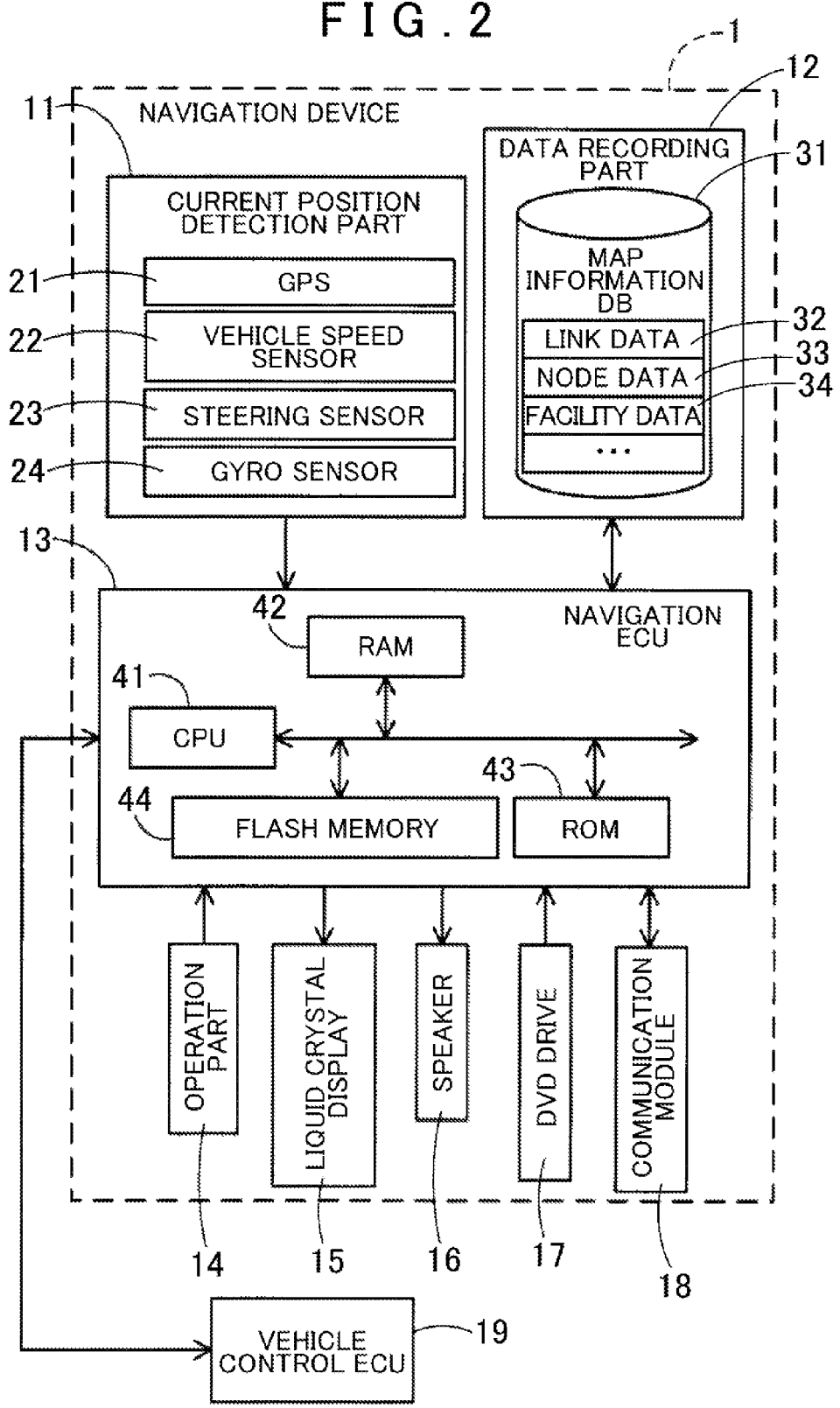
FIG. 2 is a block diagram showing a navigation device according to the embodiment.

Hereinafter, a specific embodiment of a vehicular charging facility guidance device that is implemented in a navigation device will be explained in detail with reference to the drawings.

First, a vehicle 2 in which a navigation device 1 according to the present embodiment is mounted as an in-vehicle device and a charging facility 4 provided with a charging unit that performs charging of a battery 3 mounted in the vehicle 2 will be explained with reference to FIG. 1. FIG. 1 is a schematic view of the charging facility 4 and the vehicle 2 provided with the navigation device 1 according to the present embodiment as the in-vehicle device.

The vehicle 2 provided with a battery 3 and a drive motor 5 is a vehicle of which the battery 3 can be charged from an external electric source. The battery 3 stores electric energy as well as supplies the stored electric energy to the vehicle 2. The drive motor 5 is driven by the electric energy supplied from the battery 3. As the vehicles of which the battery 3 can be charged from the external electric source, such vehicles include an electric vehicle using only a motor as a drive source and a plug-in hybrid vehicle using the motor in combination with an engine as the drive source. In the present embodiment that will be described below, the electric vehicle is used. In addition, the drive motor 5, which also functions as a regenerative brake when engine braking is necessary and at braking, is capable of regenerating vehicular inertial energy as the electric energy and charging the battery 3.

The charging facility 4 is a facility having a charging unit that is capable of charging the battery 3 by connecting a cord to a charging connector 6 provided in the vehicle 2. A home, a parking lot of a commercial facility, a vehicular charging station, and the like correspond to the charging facility.

Next, a structure of the navigation device 1 according to the present embodiment is explained with reference to FIG. 2. FIG. 2 is a block diagram showing the navigation device 1 according to the present embodiment.

As shown in FIG. 2, the navigation device 1 according to the present embodiment includes a current position detection part 11 that detects a current position of the vehicle 2, a data recording part 12 in which various data is stored, a navigation ECU 13 that performs various kinds of arithmetic processing based on the input information, an operation part 14 that receives an operation by a user, a liquid crystal display 15 that displays a map in the vicinity of the vehicle and a set guidance route to the user, a speaker 16 that outputs audio guidance regarding route guidance, a DVD drive 17 that reads a DVD as a storage medium storing a program, a communication module 18 that performs communication with an information center such as a probe center, a VICS (a registered trademark: Vehicle Information and Communication System) center, and the like. In addition, the navigation device 1 is connected, in a manner such that a two-way communication is available, with a vehicle control ECU 19 that is an electric control unit for performing overall control of the vehicle 2 including the battery 3 and the drive motor 5 mounted in the vehicle 2.

Hereinafter, the respective components composing the navigation device 1 are described.

The current position detecting part 11 is formed of a GPS 21, a vehicle speed sensor 22, a steering sensor 23, a gyro sensor 24, and the like, and can detect a current position and a direction of the vehicle, a traveling speed of the vehicle, a current time, and the like. Here, in particular, the vehicle speed sensor 22 is a sensor for detecting a moving distance and a speed of the vehicle. The speed sensor 22 generates pulses in accordance with a rotation of drive wheels of the vehicle 2, and outputs pulse signals to the navigation ECU 13. Subsequently, by counting the number of generated pulses, the navigation ECU 13 calculates a rotation speed of the drive wheels and the moving distance. Note that the navigation device 1 is not required to include all the aforementioned four kinds of sensors, and the navigation device 1 may include only one or a plurality of kinds of sensors among them.

The data recording part 12 is provided with a hard disk (not shown) serving as an external storage device and a recording medium, and a recording head (not shown) serving as a driver for reading a map information DB 31, a predetermined program, and the like, which are recorded in the hard disk, and writing predetermined data in the hard disk.

Here, the map information DB 31 is a storage unit storing, for example, link data 32 regarding roads (links), node data 33 regarding node points, facility data 34 regarding facilities, map display data for displaying a map, intersection data regarding respective intersections, search data for searching for routes, search data for searching for points, and the like.

Here, as the facility data 34, information relating to the facilities serving as a departure point, a destination, a guidance target, and the like in the navigation device 1 is stored. For example, the information relating to the charging facility 4 at which the battery 3 can be charged, accommodation facilities such as hotels and the like, commercial facilities such as malls, supermarkets, and the like, amusement facilities such as theme parks, arcades, and the like, eating and drinking establishments such as restaurants, bars, and the like, and parking facilities such as public parking lots and the like are included as the facility data 34. In addition, the facility data 34 includes, for each facility, a facility number as an identifier of a facility, a name of the facility, a category of the facility, a position coordinate of the facility, and the like. FIG. 3 shows an example of facility data 34 of facilities, in particular, corresponding to the charging facilities among the facility data 34. As shown in FIG. 3, as the facility data 34 of the charging facilities, business hours and charging fee are stored in addition to the facility number, the name of the facility, the category of the facility, and the position coordinate of the facility. For example, it is indicated that a YY station, which is a charging facility located at a coordinate (x3, y3), has the business hours of 8:00 to 21:00 and the charging fee of 20 yen/kWh.

The navigation ECU 13 provides information on the charging facility 4 located along the guidance route based on the facility data 34 as mentioned later.

On the other hand, the navigation ECU (electronic control unit) 13 is an electric control unit that: performs overall control of the navigation device 1, when the destination has been selected, for route setting processing for setting the route from the departure point (the current position or the home) to the destination based on the link data stored in the map information DB 31; map display processing for displaying the map on the liquid crystal display 15; route display processing for displaying the route to be overlapped with the map displayed on the liquid crystal display 15; frame display processing for displaying a frame, of which a reference position is allocated at a point on the displayed route, to be overlapped with the route on the liquid crystal display 15; frame movement processing for moving the frame along the route; and charging facility guidance processing for providing information on the charging facility 4 located within an area delimited by the frame on the map, and the like. The navigation ECU 13 is provided with: a CPU 41 serving as a computing device and a control device; internal storage devices such as a RAM 42 used as a working memory when the CPU 41 executes various computing processing and in which route data or the like when the route has been searched is stored; a ROM 43 which records a program for control, and a charging facility guidance processing program (refer to FIG. 4); and a flash memory 44 which records a program read from the ROM 43; and the like.

The operation part 14 is operated for inputting the departure point as a travel start point and the destination as a travel end point, and is composed of various keys and a plurality of operation switches (not shown) such as buttons. The navigation ECU 13 performs control so as to execute various kinds of operations corresponding to switch signals outputted by pressing the respective switches. The operation part 14 can be also composed of a touch panel provided on the surface of the liquid crystal display 15. In addition, the operation part 14 may be operated also when displaying distribution of the charging facilities in the vicinity of the guidance route together with a whole map of the guidance route on the liquid crystal display 15, or when scrolling or selecting the aftermentioned frame.

In addition, on the liquid crystal display 15, a map image including a road, traffic information, route guidance, an operation menu, key guidance, an expected travel route from the departure point to the destination, guidance information along the expected travel route, news, weather forecast, time, mail, television programs, and the like are displayed. Further, on the liquid crystal display 15, if a predetermined condition is met, the whole map of the guidance route together with the after-mentioned frame is displayed and also the information on the charging facility located within the area delimited by the frame on the map is displayed.

The speaker 16 outputs audio guidance for traveling the expected travel route based on an instruction from the navigation ECU 13, and the traffic information.

The DVD drive 17 is a drive capable of reading data stored in the recording medium such as a DVD, a CD, and the like, and updates the map information DB 31 based on the read data.

The communication module 18 is a communication device for receiving the traffic information including congestion information, regulation information, traffic accident information, and the like, which is transmitted from a traffic information center such as a VICS, a probe center, and the like. The communication module 18 corresponds to a cellular phone and a data communication module (DCM), for example.

Figure 4:
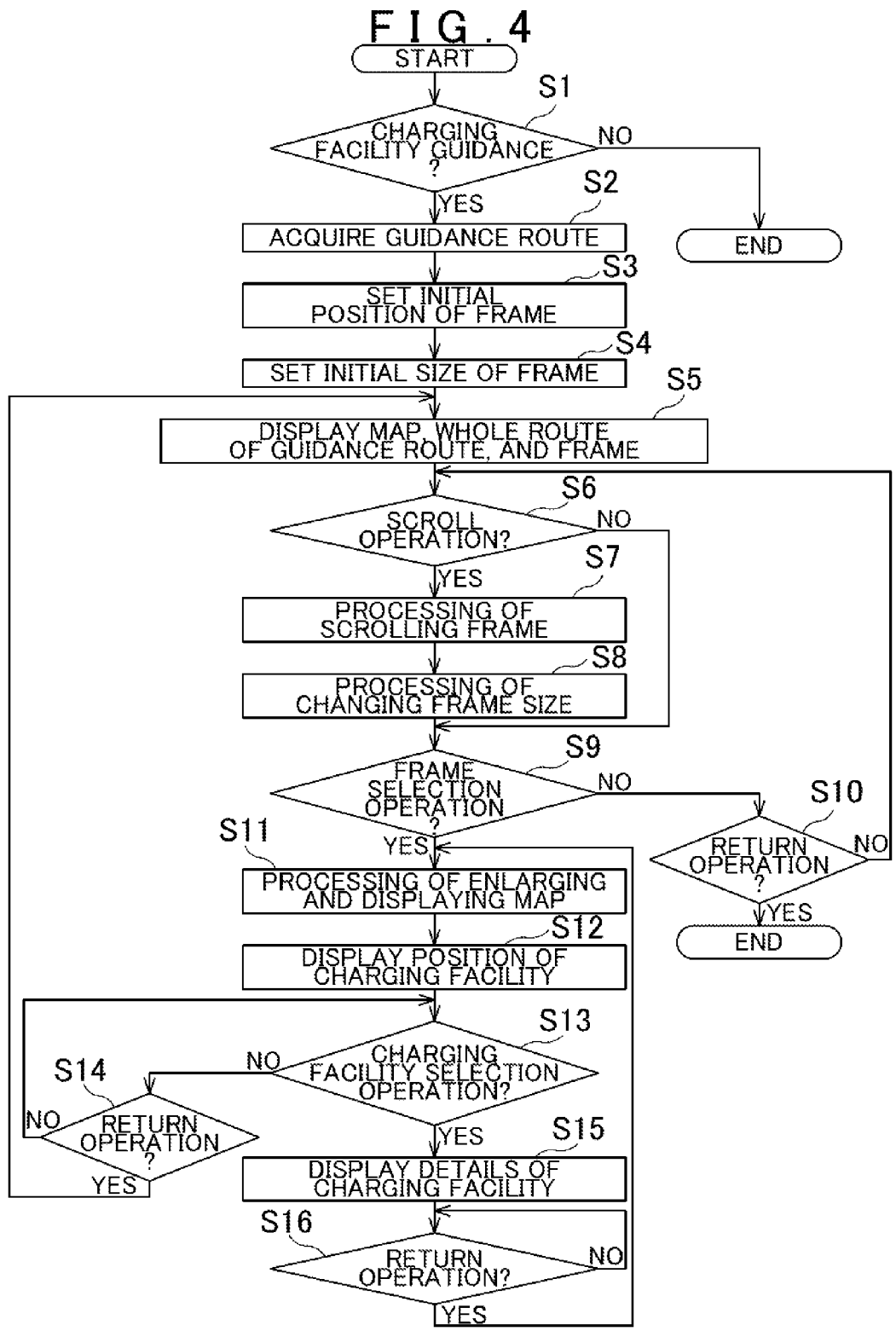
FIG. 4 is a flow chart of a charging facility guidance processing program according to the embodiment.

Subsequently, the charging facility guidance processing program executed by the CPU 41 in the navigation device 1 having the above-mentioned structure is explained with reference to FIG. 4. FIG. 4 is a flow chart of the charging facility guidance processing program according to the present embodiment. Here, the charging facility guidance processing program, which is executed when an accessory (ACC) of the vehicle 2 has been set ON, i.e., accessory position of a engine ignition, is a program for providing the information on the charging facility 4 in the vicinity of the guidance route that is set in the navigation device 1. The program shown by the flow chart in FIG. 4 is stored in the RAM 42 or the ROM 43 provided in the navigation device 1 and is executed by the CPU 41.

First, in the charging facility guidance processing program, at Step (hereinafter referred to as S) 1, the CPU 41 determines whether or not to provide the information on the charging facility 4 in the vicinity of the guidance route. In the present embodiment, the CPU 41 determines to provide the information on the charging facility in the vicinity of the guidance route (a) when the guidance route has been set in the navigation device 1, (b) when the user has performed a predetermined operation on the operation part 14, (c) when it has been determined that the vehicle 2 is not able to travel to the destination using the drive motor 5 as the drive source without charging the battery 3 from the external electric source. Whether or not the vehicle 2 is able to travel to the destination using the drive motor 5 as the drive source without charging the battery 3 from the external electric source is determined by acquiring current remaining amount of the battery 3 from the vehicle control ECU 19 and considering a distance to the destination, fuel consumption, regenerative energy amount to be charged during drive, and the like.

Next, at S2, the CPU 41 acquires the guidance route currently set in the navigation device 1.

Subsequently, at S3, the CPU 41 sets an initial position of the reference position (i.e., the center of the frame 55) as the initial position of the frame to be displayed in a charging facility guidance screen 51. The charging facility guidance screen 51 is explained below with reference to FIGS. 5 and 6.

Figure 5:
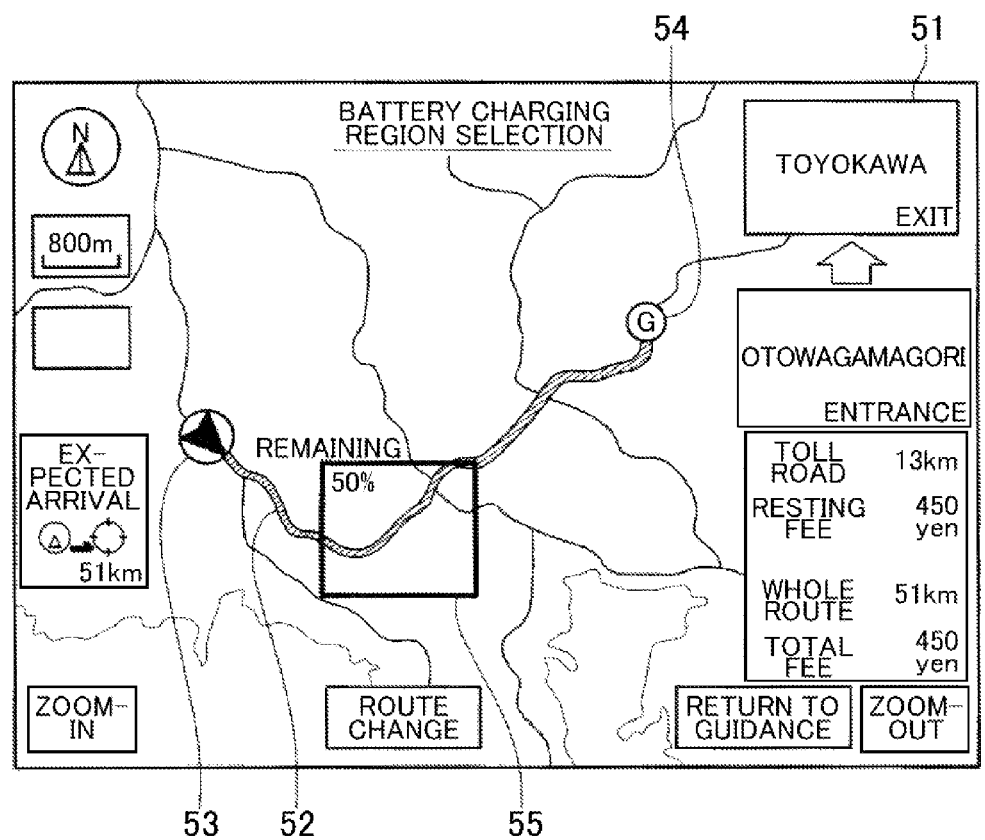
FIG. 5 shows an example of a charging facility guidance screen displayed on a liquid crystal display.
Figure 6:
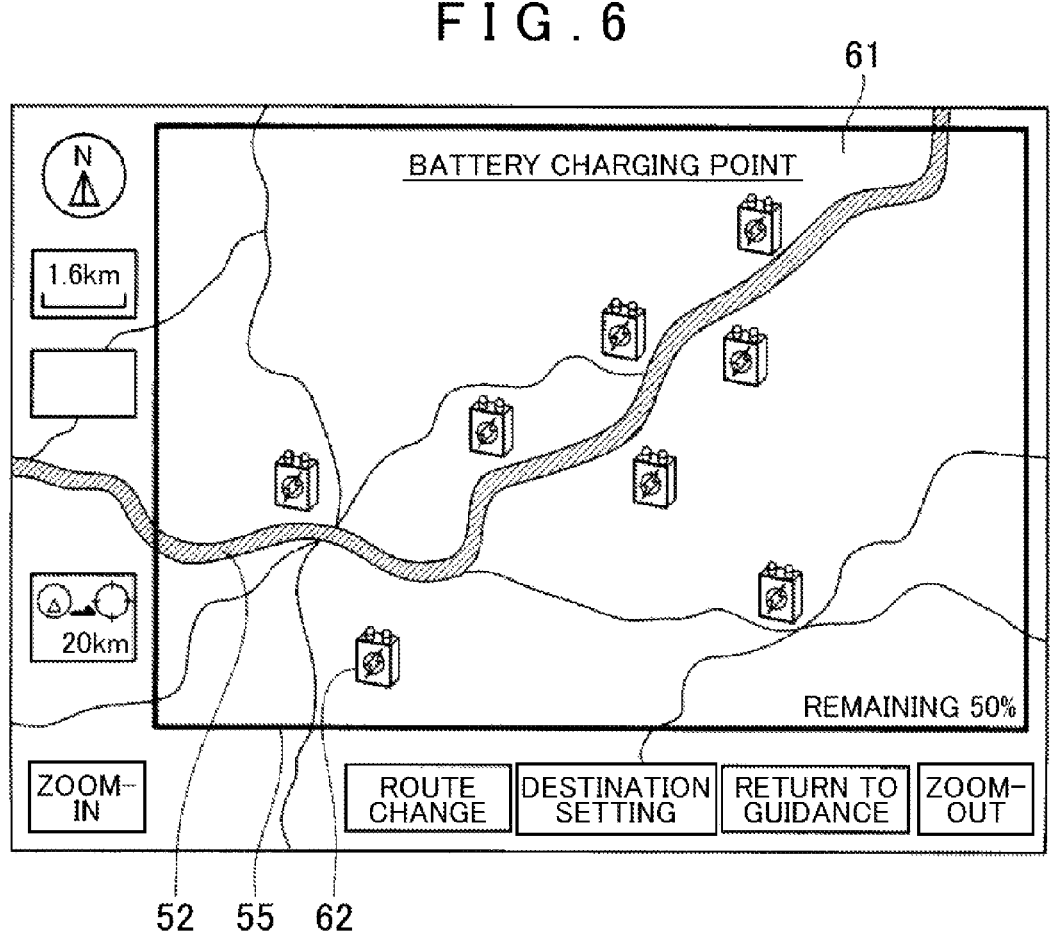
FIG. 6 shows an example of an enlarged charging facility guidance screen displayed on the liquid crystal display.

The charging facility guidance screen 51 is a guidance screen that is displayed on the liquid crystal display 15 at the after-mentioned S5 and provides the information on the charging facility in the vicinity of the guidance route. As shown in FIG. 5, in the charging facility guidance screen 51, a whole route of a guidance route 52 currently set in the navigation device 1 is displayed together with a vicinity map. Further, in the charging facility guidance screen 51, a current position mark 53 indicating the current position of the vehicle, a destination mark 54 indicating the position of the destination, and a frame 55 are overlapped with the map and displayed. Here, the frame 55 has a rectangular shape and a center point of the frame 55 as the reference position of the frame 55 is located on the guidance route 52. In addition, in the frame 55, a predicted remaining energy amount of the battery 3 when the vehicle reaches a point where the reference position (i.e., the center of the frame 55) of the frame 55 is allocated is also displayed. As mentioned later, the frame 55 is moved based on the user's operation such that the reference position moves along the guidance route 52. In addition, if the frame 55 has been selected based on the user's operation, an enlarged charging facility guidance screen 61 that is an enlarged screen of the area delimited by the frame 55 on the map is displayed on the liquid crystal display 15. FIG. 6 is an explanatory drawing of the enlarged charging facility guidance screen 61.

As shown in FIG. 6, in the enlarged charging facility guidance screen 61, one or more charging facility marks 62 to identify the position of the charging facilities are overlapped with the enlarged map of the frame 55 and displayed. Consequently, the user can visually recognize in the enlarged charging facility guidance screen 61 how the charging facilities are distributed in the vicinity of the guidance route 52. In addition, if selecting the displayed charging facility mark 62, the user can acquire detailed information (the facility name, the business hours, the travel time from the current position, and the charging fee) of the corresponding charging facility and set the corresponding charging facility as a waypoint.

At the above-mentioned S3, the CPU 41 sets the initial position of the frame 55 by the following processing of (A), (B), and (C).

(A) First, the CPU 41 determines whether or not the vehicle is able to travel to the destination using the drive motor 5 as the drive source without charging the battery 3 from the external electric source in case that the vehicle travels the guidance route. Whether or not the vehicle is able to travel to the destination using the drive motor 5 as the drive source without charging the battery 3 from the external electric source is determined by acquiring the current remaining amount of the battery 3 from the vehicle control ECU 19 and considering the distance to the destination, the fuel consumption, the regenerative energy amount to be charged during drive, and the like, in the same manner as the above-mentioned S1.

(B) If it is determined that the vehicle is able to travel to the destination using the drive motor 5 as the drive source without charging the battery 3 from the external electric source, the CPU 41 sets the initial position of the reference position of the frame 55 to the destination. As a result, the frame 55 is set to the position centered at the destination.

(C) On the other hand, if it is determined that the vehicle is not able to travel to the destination using the drive motor 5 as the drive source without charging the battery 3 from the external electric source, the CPU 41 predicts as an intermediate point a point at which the remaining energy amount of the battery 3 becomes a predetermined value ('for example, 50% of fully-charged amount) in case that the vehicle 2 travels the guidance route. The intermediate point is predicted by acquiring the current remaining amount of the battery 3 from the vehicle control ECU 19 and considering the fuel consumption, the regenerative energy amount to be charged during drive, and the like. Thereafter, the CPU 41 sets the initial position of the reference position of the frame 55 to the intermediate point. As a result, the frame 55 is set to the position centered at the intermediate point.

Next, at S4, the CPU 41 sets an initial size of the frame to be displayed on the charging facility guidance screen 51.

Specifically, at the above-mentioned S4, the CPU 41 sets the initial size of the frame 55 based on the remaining energy amount of the battery 3. Specifically, the following processing of (D) and (E) is executed.

(D) First, the CPU 41 predicts the remaining energy amount of the battery 3 when the vehicle reaches the point based on the initial position of the reference position of the frame 55 (the destination when the initial position of the reference position of the frame 55 is set to the destination, and the intermediate point when the initial position of the reference position of the frame 55 is set to the intermediate point, hereinafter referred to as an initial point) that has been set at the above-mentioned S3 in case that the vehicle travels the guidance route. The remaining energy amount of the battery 3 when the vehicle reaches the initial point is predicted by acquiring the current remaining amount of the battery 3 from the vehicle control ECU 19 and considering the distance to the initial point, the fuel consumption, the regenerative energy amount to be charged during drive, and the like.

(E) The CPU 41 sets the initial size of the frame 55 based on the predicted remaining energy amount of the battery 3 at the initial point. Specifically, the larger the remaining energy amount of the battery 3 at the initial point is, the larger the size of the frame 55 is set. For example, the CPU 41 calculates a distance, which the vehicle is able to travel with the remaining energy amount at the initial point, and sets the initial size of the frame 55 such that the calculated distance is a length of one-half of a diagonal line of the frame 55.

In addition, at the above-mentioned S4, the CPU 41 may set the initial size of the frame 55 based on the distribution of the charging facilities in the vicinity of the point where the reference position of the frame 55 is allocated. Specifically, the following processing of (F) and (G) is executed.

(F) The CPU 41 acquires from the map information DB 31 the position information of the charging facilities in the vicinity of the point where the reference position of the frame 55 is allocated, which is set at the above-mentioned S3.

(G) The CPU 41 sets a provisional size of the frame 55, acquires the number of facilities within the provisional size, and changes the provisional size such that the number of charging facilities located within the area delimited by the frame 55, of which the reference position is set at the point as the initial position, on the map becomes a predetermined number (for example, 5 to 10 facilities). Then, the CPU 41 sets as the initial size of the frame 55 the provisional size in which the number of charging facilities located within the area delimited by the frame 55 at the initial position on the map becomes the predetermined number (for example, 5 to 10 facilities). As a result, the initial size of the frame 55 is set smaller in a case where the initial position of the frame 55 is set in a region where the charging facilities are densely distributed, compared to in a case where the initial position of the frame 55 is set in a region where the charging facilities are sparsely distributed.

Further, the following processing of (H) may be executed instead of the above processing of (G).

(H) The CPU 41 acquires the positions of a predetermined number of facilities (for example, 5 to 10 facilities) in order of the distance from the point where the reference position of the frame 55 is allocated, and sets the initial size of the frame 55 to the size that includes all the acquired facilities.

Next, at S5, the CPU 41 displays the above-mentioned charging facility guidance screen 51 (FIG. 5) on the liquid crystal display 15. As mentioned above, on the charging facility guidance screen 51, the guidance route 52 and the frame 55 are overlapped with the map and displayed. In addition, the frame 55 is displayed at the initial position set at the above-mentioned S3 in the initial size set at the above-mentioned S4.

Thereafter, at S6, the CPU 41 determines whether or not the operation part 14 has accepted a scroll operation to scroll the frame 55 along the guidance route. Specifically, when the user has dragged by a finger the frame 55 displayed on the charging facility guidance screen 51, the CPU 41 determines that the operation part 14 has accepted the scroll operation.

If the CPU 41 determines that the operation part 14 has accepted the scroll operation to scroll the frame 55 along the guidance route (S6: YES), the procedure proceeds to S7. In contrast, if the CPU 41 determines that the operation part 14 does not accept the scroll operation to scroll the frame 55 along the guidance route (S6: NO), the procedure proceeds to S9.

At S7, the CPU 41 scrolls the frame 55 along the guidance route based on the accepted operation. Specifically, if an operation to drag the frame 55 in the direction of the destination mark 54 has been accepted, the reference position (the center of the frame) of the frame 55 is moved in the direction of the destination mark 54 along the guidance route, whereby the frame 55 is scrolled in the direction of the destination mark 54 along the guidance route 52. If an operation to drag the frame 55 in the direction of the current position mark 53 has been accepted, the reference position (the center of the frame) of the frame 55 is moved in the direction of the current position mark 53 along the guidance route, whereby the frame 55 is scrolled in the direction of the current position mark 53 along the guidance route 52. Further, at S8, the CPU 41 changes the size of the frame 55 as the frame 55 is scrolled.

Figure 7:
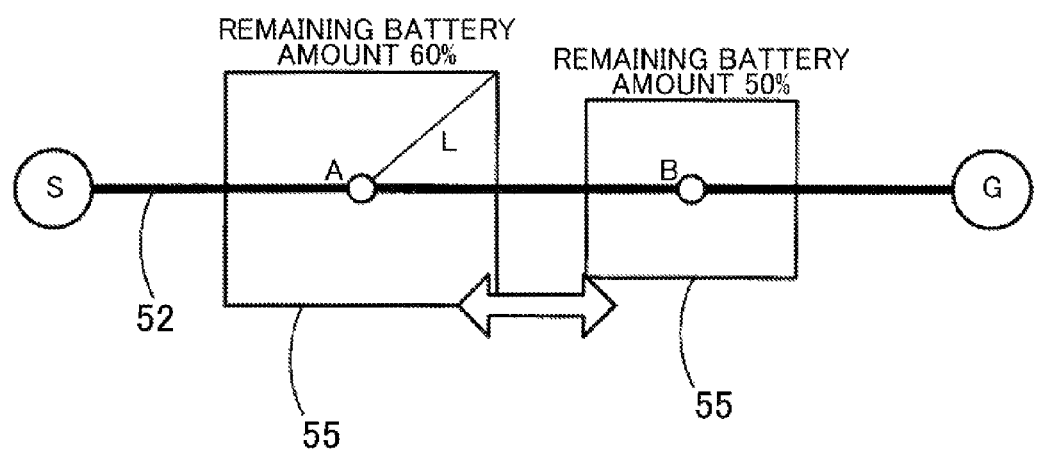
FIG. 7 shows an example of a size change of a frame based on remaining energy amount of a battery if the frame has been scrolled.

Here, at the above-mentioned S8, the CPU 41 changes the size of the frame 55 based on the remaining energy amount of the battery 3 at the point, where the reference position (the center of the frame 55) of the frame 55 is allocated, on the guidance route if the initial size of the frame 55 has been set based on the remaining energy amount of the battery 3 at the above-mentioned S4. FIG. 7 shows an example of a size change of the frame 55 based on the remaining energy amount of the battery 3 if the frame 55 has been scrolled. In the example shown in FIG. 7, it is assumed that, in case that the vehicle travels the guidance route 52, the remaining energy amount of the battery 3 when the vehicle reaches a point A on the guidance route 52 is 60% of the fully-charged amount and the remaining energy amount of the battery 3 when the vehicle reaches a point B on the guidance route 52 is 50% of the fully-charged amount. In this case, if the position of the frame 55 has been scrolled from the position when the reference position is allocated at the point A to the position when the reference position is allocated at the point B, the size of the frame 55 is changed to a smaller size. In contrast, if the position of the frame 55 has been scrolled from the position when the reference position is allocated at the point B to the position when the reference position is allocated at the point A, the size of the frame 55 is changed to a larger size. For example, the size of the frame 55 is changed such that the distance, which the vehicle is able to travel with the remaining energy amount of the battery 3 at such point, is a length L of one-half of a diagonal line of the frame 55.

Figure 8:
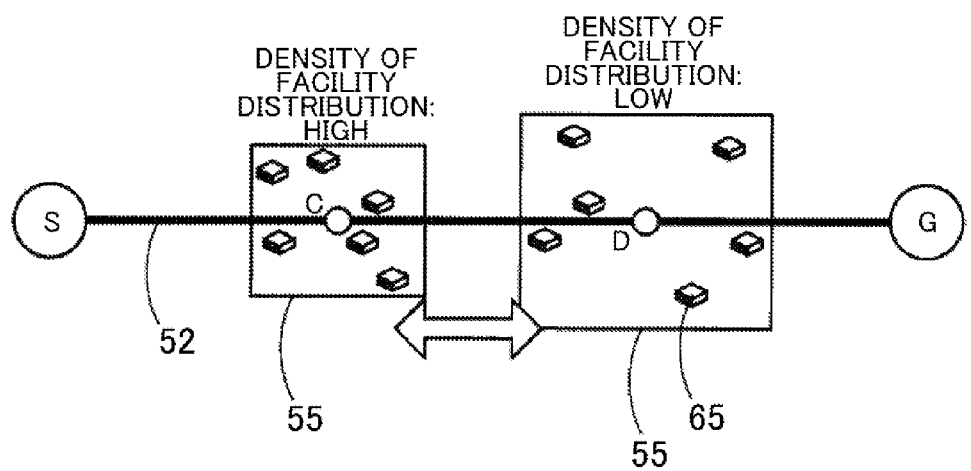
FIG. 8 shows an example of a size change of a frame based on distribution of charging facilities if the frame has been scrolled.

On the other hand, the CPU 41 changes the size of the frame 55 based on the distribution of the charging facilities in the vicinity of the point, where the reference position of the frame 55 is allocated, on the guidance route if the initial size of the frame 55 has been set based on the distribution of the charging facilities. Here, FIG. 8 shows an example of a size change of the frame 55 based on the distribution of the charging facilities if the frame 55 has been scrolled. In the example shown in FIG. 8, it is assumed that, in case that the vehicle travels the guidance route 52, the charging facilities 65 are densely distributed in the vicinity of a point C on the guidance route 52 and sparsely distributed in the vicinity of a point D on the guidance route 52. In this case, if the position of the frame 55 has been scrolled from the position when the reference position is allocated at the point C to the position when the reference position is allocated at the point D, the size of the frame 55 is changed to a larger size. In contrast, if the position of the frame 55 has been scrolled from the position when the reference position is allocated at the point D to the position when the reference position is allocated at the point C, the size of the frame 55 is changed to a smaller size. For example, the size of the frame 55 is changed such that the number of the charging facilities 65 located within the area delimited by the frame 55 on the map becomes the predetermined number (for example, 5 to 10 facilities).

Figure 9:
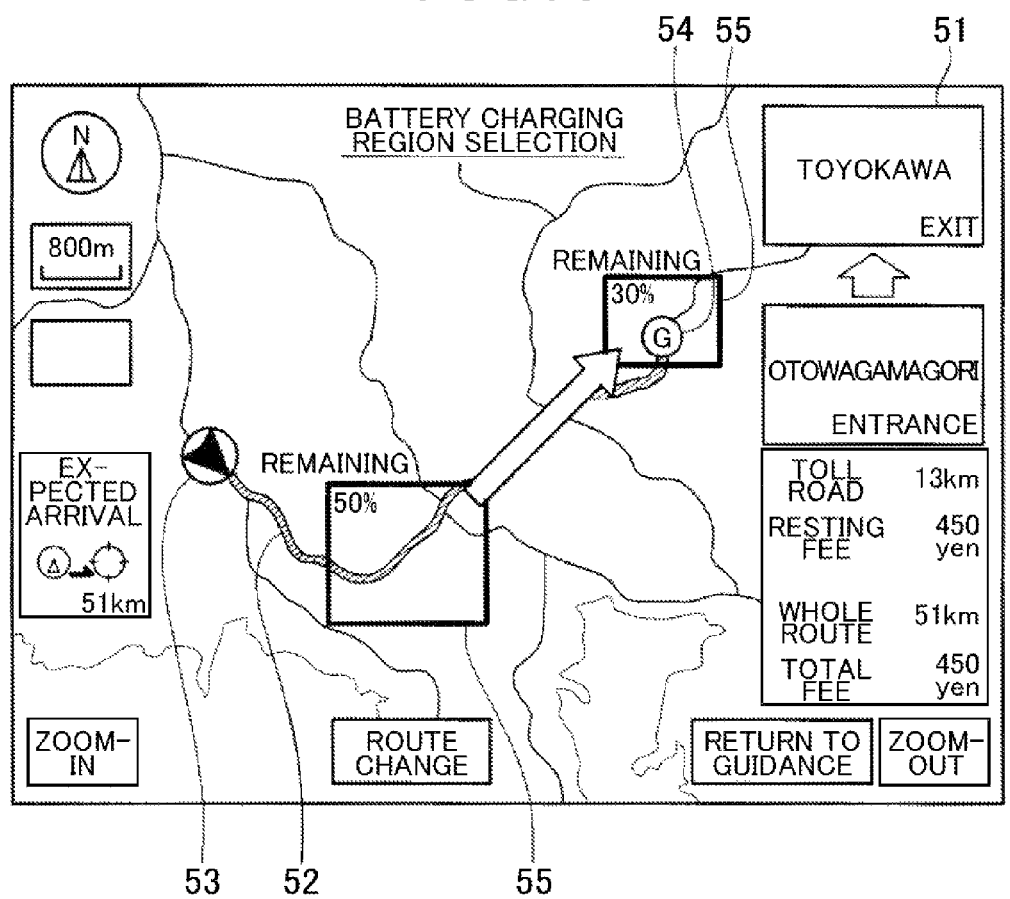
FIG. 9 shows a case in which the frame has been scrolled in the charging facility guidance screen.

For example, FIG. 9 shows the charging facility guidance screen 51 if the reference position of the frame 55 has been scrolled from the initial position to the destination. In the example shown in FIG. 9, the size of the frame 55 is changed based on the remaining energy amount of the battery 3. As shown in FIG. 9, the size of the frame 55 displayed on the charging facility guidance screen 51 gradually diminishes along with the scroll, and becomes, when the reference position arrives at the destination, the size based on 30% that is the remaining energy amount of the battery 3 when the vehicle reaches the destination.

Figure 10:
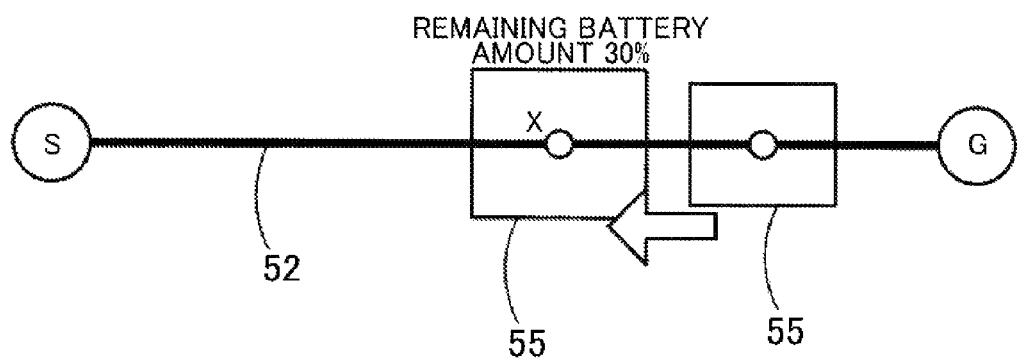
FIG. 10 shows a scroll movement of the frame based on a travel limit point.

In addition, at S7 and S8, if the reference position of the frame 55 has been scrolled toward the destination beyond the travel limit point, the CPU 41 automatically scrolls the reference position of the frame 55 to the position based on the travel limit point. Here, the travel limit point is a point which is closest to the destination among points on the guidance route to which the vehicle is able to travel without charging the battery 3 in case that the vehicle travels the guidance route. For example, as shown in FIG. 10, if it is predicted that the remaining energy amount of the battery 3 becomes a lower limit (for example, 30% of the fully-charged amount) for driving the drive motor 5 when the vehicle reaches a point X, the point X will be the travel limit point. Consequently, if the reference position of the frame 55 has been scrolled toward the destination beyond the point X, the reference position of the frame 55 is automatically scrolled to the position based on the point X.

Figure 11:
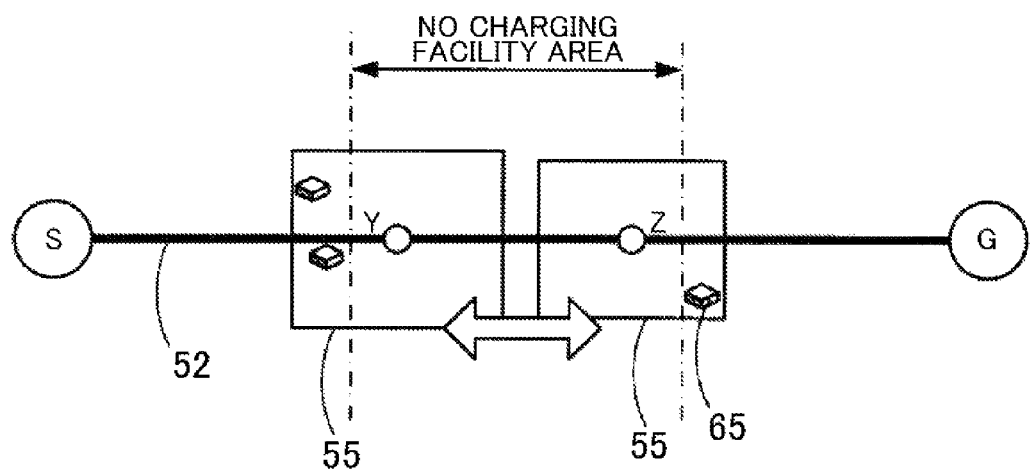
FIG. 11 shows a scroll movement of the frame based on an area in which there is not a charging facility.

In addition, at the above-mentioned S7 and S8, if the frame 55 has been scrolled to the area where there is not a charging facility, the CPU 41 automatically scrolls the frame 55 to the area where there is the charging facility. Specifically, the CPU 41 determines whether or not there is the charging facility within the area delimited by the frame 55 on the map. If it is determined that there is not the charging facility within the area delimited by the frame 55 on the map, the CPU 41 automatically scrolls the reference position of the frame 55 to the position at which the charging facility is included in the area delimited by the frame on the map. For example, as shown in FIG. 11, the processing is explained using situations as examples, in which, if the reference position of the frame 55 has been moved toward the destination beyond the position based on a point Y, there is not the charging facility 65 within the area delimited by the frame 55 on the map, and if the reference position of the frame 55 has been moved toward the departure point beyond the position based on a point Z, there is not the charging facility 65 within the area delimited by the frame 55 on the map. In such situations shown in FIG. 11, if the reference position of the frame 55 has been scrolled toward the destination beyond the point Y, the reference position of the frame 55 is automatically scrolled to the point Y, and if the reference position of the frame 55 has been scrolled toward the departure point beyond the point Z, the reference position of the frame 55 is automatically scrolled to the point Z. In addition, if the reference position of the frame 55 has been scrolled toward the destination beyond the point Y, the reference position of the frame 55 may be moved to the point Z, whereby it is possible to avoid displaying the area of which information is not necessary for the user.

If the size of the frame 55 is changed based on the number of the charging facilities located within the area delimited by the frame 55 on the map, the CPU 41 determines whether or not there is the charging facility within a predetermined distance from the reference position after the frame 55 has been scrolled, and if there is not the charging facility, further automatically scrolls the frame 55 until a condition where there is the charging facility within the predetermined distance from the reference position is met.

Subsequently, at S9, the CPU 41 determines whether or not the operation part 14 has accepted an operation to select the frame 55. Specifically, if the user has clicked the area in the frame 55 displayed on the charging facility guidance screen 51, the CPU 41 determines that the operation part 14 has accepted the operation to select the frame 55.

If it is determined that the operation part 14 has accepted the operation to select the frame 55 (S9: YES), the procedure proceeds to S11. In contrast, if it is determined that the operation part 14 does not accept the operation to select the frame 55 (S9: NO), the procedure proceeds to S10.

At S10, the CPU 41 further determines whether or not the operation part 14 has accepted an operation to return the screen. Specifically, if the user has operated a "return button" that is previously allocated on the screen or an enclosure, the CPU 41 determines that the operation part 14 has accepted the operation to return the screen.

If it is determined that the operation part 14 has accepted the operation to return the screen (S10: YES), a map image of the vicinity of the current position of the vehicle is displayed and the charging facility guidance processing program is terminated. In contrast, if it is determined that the operation part 14 does not accept the operation (S10: NO), the procedure returns to S6.

At S11, the CPU 41 enlarges the map of the area delimited by the frame 55 and displays the enlarged map on the liquid crystal display 15. Further, at S12, the CPU 41 displays the charging facility mark 62, which identifies the position of the charging facility, to be overlapped with the enlarged map. As the result, the above-mentioned enlarged charging facility guidance screen 61 (FIG. 6) is displayed.

Next, at S13, the CPU 41 determines whether or not the operation part 14 has accepted an operation to select the charging facility mark 62 displayed on the enlarged charging facility guidance screen 61. Specifically, if the user has clicked the charging facility mark 62 displayed on the enlarged charging facility guidance screen 61, the CPU 41 determines that the operation part 14 has accepted the operation to select the charging facility mark 62.

If it is determined that the operation part 14 has accepted the operation to select the charging facility mark 62 (S13: YES), the procedure proceeds to S15. In contrast, if it is determined that the operation part 14 does not accept the operation to select the charging facility mark 62 (S13: NO), the procedure proceeds to S14.

At S14, the CPU 41 determines whether or not the operation part 14 has accepted the operation to return the screen.

If it is determined that the operation part 14 has accepted the operation to return the screen (S14: YES), the procedure returns to S5 and the charging facility guidance screen 51 is displayed on the liquid crystal display 15. In contrast, if it is determined that the operation part 14 does not accept the operation to return the screen (S14: NO), the procedure returns to S13.

On the other hand, at S15, the CPU 41 displays the information relating to the charging facility that corresponds to the selected charging facility mark 62 on the liquid crystal display 15. The information to be displayed includes for example the facility name, the travel time to the facility, the business hours, the charging fee, and the like. Also, it is possible to set the charging facility that corresponds to the selected charging facility mark 62 as a waypoint. Thereafter, the procedure proceeds to S16.

At S16, the CPU 41 determines whether or not the operation part 14 has accepted the operation to return the screen.

If it is determined that the operation part 14 has accepted the operation to return the screen (S16: YES), the procedure returns to S11 and the enlarged charging facility guidance screen 61 is displayed on the liquid crystal display 15. In contrast, if it is determined that the operation part 14 does not accept the operation to return the screen (S16: NO), the information relating to the charging facility that corresponds to the selected charging facility mark 62 continues displayed on the liquid crystal display 15.

As mentioned above, in the navigation device 1 according to the present embodiment, a vehicular charging facility guidance method by the navigation device 1 and a computer program executed in the navigation device 1, the frame 55, of which the reference position is allocated at a point on the guidance route, is displayed on the liquid crystal display 15 together with the whole route of the guidance route 52 set in the navigation device 1 (S5), the reference position of the frame 55 is scrolled along the guidance route if the operation to scroll the frame 55 has been accepted (S7 and S8), and the map of the area delimited by the frame 55 is enlarged and displayed on the liquid crystal display 15 and the charging facility mark 62 to identify the position of the charging facility is overlapped with the enlarged map and displayed if the operation to select the frame 55 has been accepted (S11 and S12). Therefore, it is possible to recognize in a clear and detailed manner how the charging facilities are distributed with respect to the guidance route. As a result, it becomes possible to make a charging plan of the battery appropriate in traveling the guidance route.

In addition, in case that the vehicle travels the guidance route, the size of the frame 55, of which the reference position is allocated at a point on the guidance route, changes based on the remaining energy amount of the battery 3 at the point (S8). Therefore, it is possible to provide the information on the charging facility located within the area in which the vehicle is able to travel. Consequently, it is possible to provide the information exclusively on the charging facility useful for the user.

In addition, the size of the frame 55 changes based on the distribution of the charging facilities in the vicinity of the point where the reference position of the frame is allocated (S8). Therefore, it is possible to change the size of the frame 55 based on the density and the number of the charging facilities. As a result, for example, it is possible to prevent providing information on an excessive number of charging facilities in the region where the charging facilities are densely distributed, and to provide the information on a minimum number of the charging facilities required for the user to select the charging facility to stop-by in the region where the charging facilities are sparsely distributed.

In addition, in case that the vehicle travels the guidance route, the initial position of the reference position of the frame 55 is set to the intermediate point at which the remaining energy amount of the battery 3 becomes the predetermined value (S3). Therefore, it is possible to initially provide the user with the information on the charging facility for the area where the user is predicted to charge the battery. Consequently, it is possible to reduce operations to be performed by the user.

In addition, in case that the vehicle travels the guidance route, if the reference position of the frame 55 has been moved toward the destination beyond the travel limit point to which the vehicle is able to travel, the reference position of the frame is moved to the travel limit point. Therefore, it is possible to provide the information exclusively on the charging facility useful for the user.

In addition, if it is determined that there is no charging facility within the area delimited by the frame 55 on the map, the frame is moved to the position at which a charging facility is included in the area delimited by the frame 55 on the map. Therefore, it is possible to avoid providing the information for the area of which information is not necessary for the user. Further, it is possible to reduce operations to be performed by the user.

In addition, in the enlarged charging facility guidance screen 61 displayed if the frame 55 has been selected, the area delimited by the frame 55 on the map in the charging facility guidance screen 51 is enlarged and displayed, and the charging facility mark 62 to identify the position of the charging facility is overlapped with the map and displayed. Therefore, it is possible to properly provide the information on the accurate position of each charging facility existing in the vicinity of the guidance route and the distribution of the charging facilities.

The present invention is not limited to the above-mentioned embodiment. Various improvements and/or alternatives may be possible without departing from the broad spirit and scope of the underlying principles.

For example, in the present embodiment, the navigation device 1 mounted in the electric vehicle that travels using only the drive motor 5 as the drive source is applied as the example. The drive motor 5 is driven based on the electric energy supplied from the battery 3. However, another vehicle may be applied provided that it has a structure in which the battery can be charged at the charging facility. For example, the navigation device may be mounted in the plug-in hybrid vehicle. The plug-in hybrid vehicle can travel using the engine as the drive source; however, there is a demand for traveling with the drive motor as the drive source as much as possible. Therefore, the present invention is also valid to the plug-in hybrid vehicle.

Figure 12:
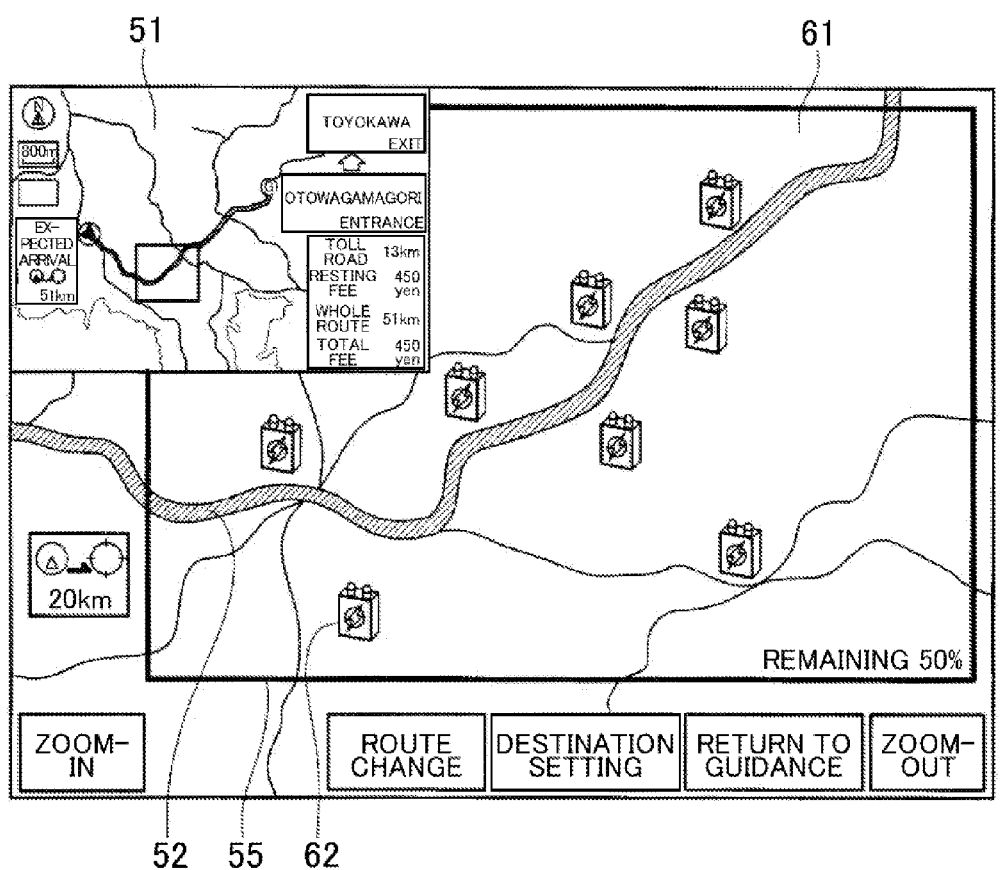
FIG. 12 shows an example of a variation of the charging facility guidance screen displayed on the liquid crystal display.

In addition, in the present embodiment, if the frame 55 has been selected when the charging facility guidance screen 51 is displayed on the liquid crystal display 15, the display screen on the liquid crystal display 15 is switched to the enlarged charging facility guidance screen 61. However, the charging facility guidance screen 51 and the enlarged charging facility guidance screen 61 may be displayed at the same time. For example, as shown in FIG. 12, the charging facility guidance screen 51 is displayed at a display area at the upper-left of the liquid crystal display 15, and the enlarged charging facility guidance screen 61 is displayed at other part. As a result, it becomes possible for the user to perform a scroll operation of the frame 55 and acquire the position information of the charging facility located in the frame 55 without switching the screen.

In addition, in the present embodiment, the whole route of the guidance route 52 is displayed in the charging facility guidance screen 51 in a single screen. However, only a part of the guidance route 52 may be displayed. In such case, the whole route of the guidance route 52 can be displayed by scrolling the screen.

In the present embodiment, the shape of the frame 55 to be displayed in the charging facility guidance screen 51 is a rectangular shape. However another shape (a circle or the like) may be applied.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A vehicular charging facility guidance device comprising:
    a route setting unit that sets a route from a departure point of a vehicle to a destination;
    a map display unit that displays a map on a display device;
    a route display unit that displays the route set by the route setting unit to be overlapped with the map displayed on the display device;
    a frame display unit that displays a frame to be overlapped with the route on the display device, the frame includes a reference position at a point on the route;
    a frame movement unit that moves the reference position of the frame displayed by the frame display unit along the route;
    a charging facility guidance unit that provides information on a charging facility located within an area delimited by the frame on the map;
    a remaining energy amount prediction unit that, in case that the vehicle travels the route, predicts a remaining energy amount of an in-vehicle battery at a point on the route, the in-vehicle battery supplying electric power to a drive source of the vehicle; and
    an energy amount size setting unit that sets a size of the frame, of which the reference position is allocated at the point on the route, based on the predicted remaining energy amount of the in-vehicle battery at the point.

2. The vehicular charging facility guidance device according to claim 1, further comprising a facility number size setting unit that sets a size of the frame, of which the reference position is allocated at the point on the route, based on distribution of charging facilities in the vicinity of the point.

3. The vehicular charging facility guidance device according to claim 1, further comprising:

a travel determination unit that, in case that the vehicle travels the route, determines whether the vehicle is able to travel to the destination without charging an in-vehicle battery that supplies electric power to a drive source of the vehicle;

an intermediate point prediction unit that, in case that the vehicle travels the route, predicts as an intermediate point a point at which a remaining energy amount of the in-vehicle battery becomes a predetermined value; and an initial position setting unit that, if the travel determination unit determines that the vehicle is able to travel to the destination without charging the in-vehicle battery, sets an initial position of the reference position of the frame to the destination, and if the travel determination unit determines that the vehicle is not able to travel to the destination without charging the in-vehicle battery, sets the initial position of the reference position of the frame to the intermediate point.

4. The vehicular charging facility guidance device according to claim 1, further comprising a travel limit point prediction unit that, in case that the vehicle travels the route, predicts as a travel limit point a point which is closest to the destination among points on the route to which the vehicle is able to travel without charging an in-vehicle battery that supplies electric power to a drive source of the vehicle, wherein the frame movement unit moves the reference position of the frame to the travel limit point if the reference position of the frame has been moved toward the destination beyond the travel limit point.

5. The vehicular charging facility guidance device according to claim 1, further comprising a charging facility determination unit that determines whether or not there is the charging facility within the area delimited by the frame on the map, wherein the frame movement unit, if the charging facility determination unit determines that the charging facility is not within the area delimited by the frame on the map, moves the reference position of the frame to a position at which the charging facility is included in the area delimited by the frame on the map.

6. The vehicular charging facility guidance device according to claim 1, wherein the charging facility guidance unit enlarges and displays the area delimited by the frame on the map on the display device, and displays a mark to identify a position of the charging facility to be overlapped with the map.

7. The vehicular charging facility guidance device according to claim 2, wherein the size of the frame is set based on a number of charging facilities located within a predetermined distance of the point.

8. The vehicular charging facility guidance device according to claim 2, wherein the size of the frame is set so as to display a predetermined number of charging facilities.

9. A vehicular charging facility guidance method, the method comprising:

setting, by a processor, a route from a departure point of a vehicle to a destination;

displaying, by the processor, a map on a display device;

displaying, by the processor, the route set to be overlapped with the map displayed on the display device;

displaying, by the processor, a frame to be overlapped with the route on the display device, the frame of which a reference position is allocated at a point on the route;

moving, by the processor, the reference position of the frame displayed along the route;

providing, by the processor, information on a charging facility located within an area delimited by the frame on the map;

predicting, by the processor, in case that the vehicle travels the route, a remaining energy amount of an in-vehicle battery at a point on the route, the in-vehicle battery supplying electric power to a drive source of the vehicle; and setting a size of the frame, of which the reference position is allocated at the point on the route, based on the predicted remaining energy amount of the in-vehicle battery at the point.

10. A program stored on a non-transitory computer readable medium that causes a computer to perform the functions of:

setting a route from a departure point of a vehicle to a destination;

displaying a map on a display device;

displaying the route set by the route setting function to be overlapped with the map displayed on the display device;

displaying a frame to be overlapped with the route on the display device, the frame of which a reference position is allocated at a point on the route;

moving the reference position of the frame displayed by the frame display function along the route;

providing information on a charging facility located within an area delimited by the frame on the map;

predicting in case that the vehicle travels the route, a remaining energy amount of an in-vehicle battery at a point on the route, the in-vehicle battery supplying electric power to a drive source of the vehicle; and setting a size of the frame, of which the reference position is allocated at the point on the route, based on the predicted remaining energy amount of the in-vehicle battery at the point.

* * * * *